(12) United States Patent
Gennari et al.

(10) Patent No.: US 6,491,864 B2
(45) Date of Patent: Dec. 10, 2002

(54) PLANT FOR CHARGING METAL CARRIERS TO MELT-DOWN GASIFYING ZONE

(75) Inventors: Udo Gennari, Linz (AT); Johannes-Leopold Schenk, Linz (AT)

(73) Assignees: Voest-Alpine Industrieanlagenbau GmbH, Linz (AT); Pohang Iron & Steel Co., Ltd., Kyong Sang Book-Do (KR); Research Institute of Industrial Science & Technology, Inc., Foundation, Pohang (KR)

( * ) Notice: Subject to any disclaimer, the term of this patent is extended or adjusted under 35 U.S.C. 154(b) by 0 days.

(21) Appl. No.: 09/883,176

(22) Filed: Jun. 19, 2001

(65) Prior Publication Data

US 2001/0033045 A1 Oct. 25, 2001

Related U.S. Application Data

(62) Division of application No. 09/223,372, filed on Dec. 30, 1998, now Pat. No. 6,258,148, which is a continuation of application No. PCT/AT97/00154, filed on Jul. 9, 1997.

(30) Foreign Application Priority Data

Jul. 11, 1996 (AT) .............................................. 1252/96

(51) Int. Cl.[7] .............................................. C21B 13/00
(52) U.S. Cl. ........................ 266/160; 266/172; 266/182
(58) Field of Search ................................ 266/160, 172, 266/182

(56) References Cited

U.S. PATENT DOCUMENTS

| | | |
|---|---|---|
| 3,264,096 A | 8/1966 | Agarwal et al. |
| 4,699,655 A | 10/1987 | Milionis et al. |
| 5,948,139 A | 9/1999 | Kepplnger et al. |
| 6,210,627 B1 * | 4/2001 | Gennari et al. ............. 266/172 |
| 6,315,943 B1 * | 11/2001 | Nagl ........................... 266/182 |

FOREIGN PATENT DOCUMENTS

| | | |
|---|---|---|
| EP | B1 0010627 | 12/1981 |
| EP | B1 0111176 | 5/1986 |
| EP | A3 0217331 | 4/1987 |
| EP | A1 0576414 | 12/1993 |
| EP | A1 0594557 | 4/1994 |
| FR | 1209963 | 3/1960 |
| GB | 866646 | 4/1961 |
| GB | 1090826 | 11/1967 |

* cited by examiner

*Primary Examiner*—Melvyn Andrews
(74) *Attorney, Agent, or Firm*—Birch, Stewart, Kolasch & Birch, LLP

(57) ABSTRACT

Plant for charging metal carriers which contain a portion of fines and are at least partially reduced to a melter gasifier in which a melt-down gasifying zone formed by a bed is maintained, the metal carriers and carbon carriers are fed into the melter gasifier above the level of the melt-down gasifying zone. The metal carriers descend to the melt-down gasifying zone and travel through the same forming a metal melt and producing a reducing gas by coal gasification. In order to prevent a partial discharge from the melter gasifier of the metal carriers, in particular of the fine particles thereof, when charging the same, feeding of the metal carriers into the interior of the melter gasifier is effected at a vertical distance below a dome (30) terminating the melter gasifier toward the top, gravitationally and under the formation of a strand (44), and the strand (44) is surrounded by a gas jacket (45) enclosing and accompanying the freely falling strand (44) from its level of origin (at 40) onwards over a section (46) of the fall, and in this section (46) the strand (44) is supported against expansion by the gas jacket (45).

7 Claims, 2 Drawing Sheets

PLANT FOR CHARGING METAL CARRIERS TO MELT-DOWN GASIFYING ZONE

This application is a divisional application, Ser. No. 09/223,372, filed on Dec. 30, 1998, now U.S. Pat. No. 6,258,148, which is a con PCT/AT97/00154, Jul. 9, 1997, incorporated by reference and for which priority is claimed under 35 U.S.C. §120; and this application claims priority of Application No. A1252/96 filed in AUSTRIA on Jul. 11, 1996 under 35 U.S.C. §119.

The invention relates to a method of charging metal carriers, in particular sponge iron, which contain a portion of fines and are at least partially reduced to a melter gasifier in which a melt-down gasifying zone formed by a bed is maintained, wherein the metal carriers and carbon carriers are fed into the melter gasifier above the level of the melt-down gasifying zone and descend to the melt-down gasifying zone and travel through the same forming a metal melt, in particular forming a pig iron melt, and producing a reducing gas by coal gasification, as well as to a plant for carrying out the method.

From EP-B - 0 010 627 it is known to feed in particulate iron-containing material, such as pre-reduced sponge iron, through a centrally arranged charging opening in the hood of the melter gasifier from above, with the particles dropping into the melter gasifier by the action of gravity and being slowed down in the fluidized bed present within the melter gasifier. Coal in lumpy form is charged through a charging opening arranged laterally in the hood of the melter gasifier or in the dome terminating the melter gasifier toward the top, also under the influence of gravity. The reducing gas formed in the melter gasifier is withdrawn through the centrally arranged charging opening for the iron-containing material.

A process of this kind is not suitable for processing fine-particle metal carriers, in particular fine-particle sponge iron, since the fine-particle metal carriers due to the pronounced gas flow of the reducing gas formed in the melt-down gasifying zone and withdrawn through the central charging opening arranged in the hood or in the dome of the melter gasifier would be instantly carried out of the melter gasifier. Such a discharge of the fine-particle metal carriers is further favored by the temperature prevailing in the upper region of the melter gasifier, i.e. in the region above the melt-down gasifying zone, which is too low to ensure a melt-down, i.e. agglomeration of the fine particles at the charging site to form bigger particles which in spite of the ascending gas stream could sink down into the melt-down gasifying zone.

From EP-A - 0 217 331 it is known to introduce pre-reduced fine ore into a melter gasifier and to completely reduce and melt it by means of a plasma burner while supplying a carbon-containing reducing agent. The pre-reduced fine ore or the sponge-iron powder respectively is fed to a plasma burner provided in the lower section of the melter gasifier. A disadvantage of this method is that by feeding the pre-reduced fine ore directly in the lower melt-down region, i.e. in the region where the melt collects, complete reduction can no longer be ensured and the chemical composition necessary for further processing the pig iron cannot be achieved by any means. Moreover, the charging of large amounts of pre-reduced fine ore is not feasible, on account of the fluidized bed or the fixed bed forming from coal in the lower region of the melter gasifier, as it is not possible to carry off a sufficient quantity of the melting products from the high-temperature zone of the plasma burner. The charging of major amounts of pre-reduced fine ore would lead to instant thermal and mechanical failure of the plasma burner.

From EP-B - 0 11 1176 it is known to feed a fine grain fraction of sponge iron particles into the melter gasifier through a downpipe projecting from the head of the melter gasifier into the proximity of the coal fluidized bed. At the end of the downpipe a baffle plate is provided for minimizing the velocity of the fine grain fraction, resulting in a very low exit velocity of the fine grain fraction from the downpipe. At the charging site, the temperature reigning in the melter gasifier is very low, whereby immediate melting of the supplied fine grain fraction is prevented. This and the low exit velocity from the downpipe cause a substantial portion of the supplied fine grain fraction to be carried out of the melter gasifier again together with the reducing gas generated in the same. The charging of a major amount of sponge iron particles containing a fine portion or of only a fine grain fraction is not feasible in accordance with this method.

From EP-A - 0 594 557 it is known to charge a fine grain fraction of sponge iron by means of a conveying gas directly into the fluidized bed formed by the melt-down gasifying zone in the melter gasifier. However, this is disadvantageous, since hereby the gas-circulation of the fluidized bed may be disturbed because obstructions of the fluidized bed, which acts like a filter, may ensue as a consequence of the fine grain fraction that is blown directly into the fluidized bed. As a result, eruptive outbreaks of gas may occur which will break up the clogged fluidized bed. Hereby, the gasification process for the carbon carriers and also the melt-down process for the reduced iron ore are markedly disturbed.

From EP-A - 0 576 414 it is known to feed fine-particle metal carriers to the melt-down gasifying zone via dust burners. One disadvantage associated with this process is that there may result regions with an excess of metal and regions with an excess of carbon in the melt-down gasifying zone.

The invention aims at avoiding these disadvantages and difficulties and has as its object to provide a method of the initially described kind and a plant for carrying out the method, with said method and plant allowing processing of fine-particulate metal carriers without the need of briquetting and wherein, on the one hand, discharge of the supplied fine particles in the pre-reduced or in the completely reduced state by the reducing gas generated in the melter gasifier is reliably avoided and on the other hand, if necessary, a final reduction of the fine particles is ensured. The necessity of separating the metal carriers into a coarse- and a fine-grain fraction is to be avoided. A further object to be achieved in accordance with the invention is to attain a distribution as uniform as possible of the metal carriers and the carbon carriers in the bed of the melt-down gasifying zone.

In accordance with the invention, this object is achieved in that at a vertical distance below a dome terminating the melter gasifier toward the top the metal carriers are fed into the interior of the melter gasifier gravitationally and under the formation of a strand and that the strand is surrounded by a gas jacket enclosing and accompanying the freely falling strand from its level of origin onwards over a section of the fall, and that in this section the strand is supported against expansion by the gas jacket.

Due to the fact that in accordance with the invention the strand is enclosed by a gas jacket supporting the strand, the device that charges the metal carriers into the interior of the melter gasifier, f.i. a downpipe, can be kept short, so that the metal carriers are kept compact over a longer range. By this method, discharge of finer particles of the metal carriers is strongly reduced although the downpipe can be kept short.

This also offers the additional advantage of a slight mechanical load on the downpipe, resulting in a high stability of the same.

In accordance with a preferred procedure, the gas jacket is formed by a cooling gas which under the formation of a cooling jacket surrounds a downpipe conducting the metal carriers into the interior of the melter gasifier. Hereby, the gas forming the gas jacket is utilized doubly, namely on the one hand as a cooling gas for the downpipe and on the other hand as a protective jacket forming an extension of the downpipe.

Due to the formation of a cooling jacket for the downpipe it is feasible to utilize commercial high-temperature steels for the downpipe in spite of the high temperatures above the meltdown-gasifying zone, i.e. in the region of the dome that terminates the melter gasifier toward the top. It is in fact known from EP-B - 0 111 176 to provide a downpipe in a melter gasifier, with said downpipe projecting into the melter gasifier from the top to closely above the upper limit of the fluidized bed formed from coal within the melter gasifier, and to provide it with a water cooling. However, such a water cooling constitutes a high safety risk, since water intake into the melter gasifier may lead to the formation of oxyhydrogen gas and hence to explosions.

Preferably, the level of origin of the strand is fixed in a region of the melter gasifier where the maximum velocity of the reducing gas is 0.45 to 0.5 m/s. Hereby, the means for charging the metal carriers to the melter gasifier, f.i. the downpipe, can be kept short and the amount of gas consumed in forming the gas jacket can be kept low.

Preferably, the gas jacket supports the strand against expansion over a section of the height of fall in that the maximum velocity of the reducing gas is 0.2 to 0.3 m/s, thereby minimizing discharge of the fine particles of the metal carriers.

To attain a good supporting effect of the gas jacket, the gas jacket is suitably formed by a gas which flows downward and parallel to the strand and which has a velocity of flow more than ten times, preferably more than fifty times the maximum velocity of the reducing gas in the interior of the melter gasifier.

Utilizing gas from the process itself to serve as the cooling gas and for forming the gas jacket is not only economical but also prevents a change in the composition of the gas in the melter gasifier that would affect the melting-gasifying process.

A plant for carrying out the method, comprising a melter gasifier which has feed ducts for oxygen-containing gases and carbon carriers and at least partially reduced metal carriers and from which a gas discharge duct for a reducing gas departs in the region of a dome terminating the melter gasifier toward the top, and which is provided with a tap for a metal melt, in particular for pig iron and slag, is characterized in that in a dome terminating the melter gasifier toward the top, at a radial distance from at least one gas discharge duct for reducing gas, at least one feed duct with a charging unit for at least partially reduced metal carriers is provided, equipped with a downpipe ending at a distance below the wall that forms the dome, wherein said downpipe is provided with a gas supply means for the generation of a gas jacket forming at the lower end of the downpipe.

Preferably, the downpipe comprises a double jacket defining an annular gap cavity and the gas supply means opens into said annular gap cavity.

For the formation of the gas jacket, the lower end of the downpipe suitably is provided with an annular gap opening or several openings for the exit of a gas flowing through the annular gap cavity.

To attain a distribution as uniform as possible of the metal carriers in the fluidized bed it is of advantage if a plurality of downpipes is arranged at the dome of the melter gasifier, preferably is disposed in a radially symmetrical arrangement.

The invention is in particular suited to a plant for the production of metal melts, in particular pig iron, from charging substances formed of ore, in particular iron ore, and of fluxes and at least partially containing a portion of fines, which is characterized by at least two fluidized bed reactors subsequently connected in series, wherein the ore is conducted from fluidized bed reactor to fluidized bed reactor via conveying ducts in one direction and reducing gas is conducted from fluidized bed reactor to fluidized bed reactor via reducing-gas connecting ducts in the opposite direction, and by a melter gasifier into which there runs a feed duct conducting the reduction product from the fluidized bed reactor arranged last in the direction of the ore flow and whose gas discharge duct runs into the fluidized bed reactor arranged last in the direction of the ore flow.

BRIEF DESCRIPTION OF THE DRAWINGS

The invention will now be described in more detail with reference to an exemplary embodiment illustrated in the drawing, wherein FIG. 1 shows, by way of example only, an entire plant for the production of metal melts, in particular pig iron or liquid steel pre-products, in schematic representation. FIG. 2 illustrates a detail of FIG. 1 on an enlarged scale. FIG. 3 shows a top view of the melter gasifier in schematic representation.

DESCRIPTION OF THE PREFERRED EMBODIMENT OF THE INVENTION

Figure 1:
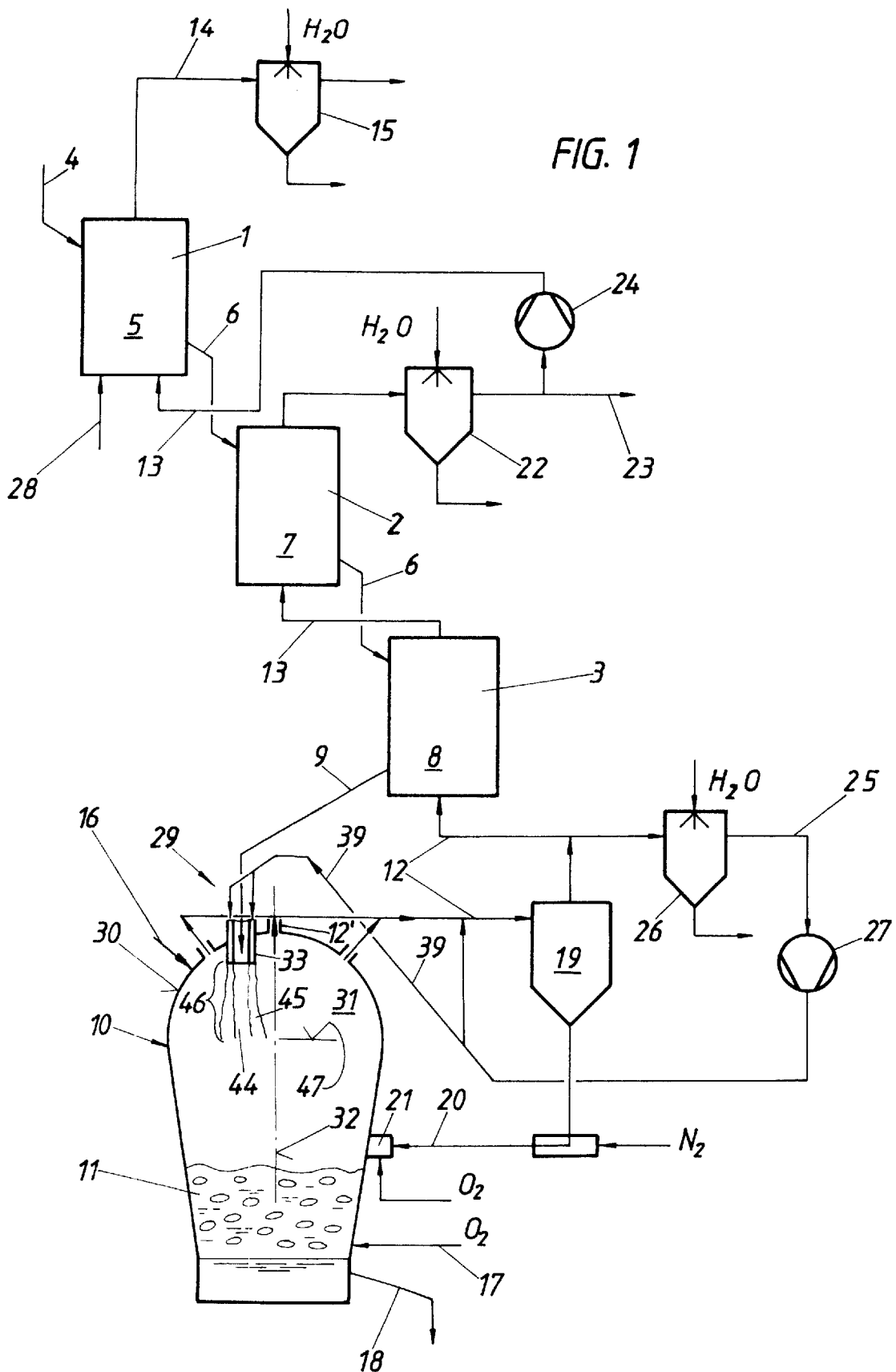
FIG. 1 is a schematic diagram showing the plant for the production of metal melts.

The plant according to FIG. 1 is provided with three fluidized-bed reactors 1 to 3 subsequently connected in series, wherein an iron-oxide-containing material, such as fine ore, comprising at least a portion of fine-grain material via an ore feed duct 4 is supplied to the first fluidized-bed reactor 1 in which in a preheating stage 5 preheating of the fine ore and possibly pre-reduction takes place, and subsequently is conducted from fluidized-bed reactor 1 to fluidized-bed reactor 2, 3 via conveying ducts 6. Inside the fluidized-bed reactor 2, pre-reduction is effected in a pre-reduction stage 7, and inside the fluidized-bed reactor 3 in a final reduction stage 8 final or complete reduction respectively of the fine ore to sponge iron.

Via a conveying duct 9, the completely reduced material, hence the sponge iron, is fed into a melter gasifier 10, namely in a specific manner to be described lateron. Inside the melter gasifier 10, in a melt-down gasifying zone 11 formed by a fluidized bed, a CO- and $H_2$-containing reducing gas is generated from carbon carriers, such as coal, and oxygen-containing gas and via a gas discharge duct 12 serving as a reducing-gas feed duct 12 for the fluidized-bed reactor 3 arranged last in the direction of flow of the fine ore is introduced into said fluidized-bed reactor 3. The reducing gas is discharged from the melter gasifier 10 via several gas outlet connections 12' which—viewed from the ground plan (cf. FIG. 3)—are radially symmetrically arranged.

In counterflow to the ore flow, the reducing gas is then conducted from fluidized-bed reactor 3 to fluidized-bed reactor 2 to 1, namely via the connecting ducts 13, is conducted out of the fluidized-bed reactor 1 as a top gas via the top-gas discharge duct 14 and subsequently is cooled and scrubbed in a wet scrubber 15.

The melter gasifier 10 is provided with a feed duct 16 for solid carbon carriers, a feed duct 17 for oxygen-containing gases as well as optionally feed ducts for carbon carriers, such as hydrocarbons, that are liquid or gaseous at room temperature and for calcined fluxes. Inside the melter gasifier 10, below the melt-down gasifying zone 11, molten pig iron or molten steel pre-material respectively and molten slag collect, which are tapped off through a tap 18.

In the reducing-gas feed duct 12 departing from the melter gasifier 10 and running into the fluidized-bed reactor 3, a dedustifying means 19, such as a hot gas cyclone, is provided, the dust particles separated in said cyclone being fed to the melter gasifier 10 via the return duct 20, with nitrogen as the conveying means and passing via a burner 21 under the blowing of oxygen.

A possibility for adjusting the reducing-gas temperature results due to the gas recirculating duct 25, which is preferably provided and which departs from the reducing-gas feed duct 12, and which via a scrubber 26 and a compressor 27 feeds back a portion of the reducing gas into said reducing-gas feed duct 12, namely at a position preceding the hot gas cyclone 19.

In order to adjust the preheating temperature of the fine ore it is feasible to supply to the preheating stage 5, hence to the fluidized-bed reactor 1, an oxygen-containing gas, such as air or oxygen, through a duct 28, whereby a partial combustion of the reacted reducing gas supplied to the preheating stage 5 takes place.

Figure 2:
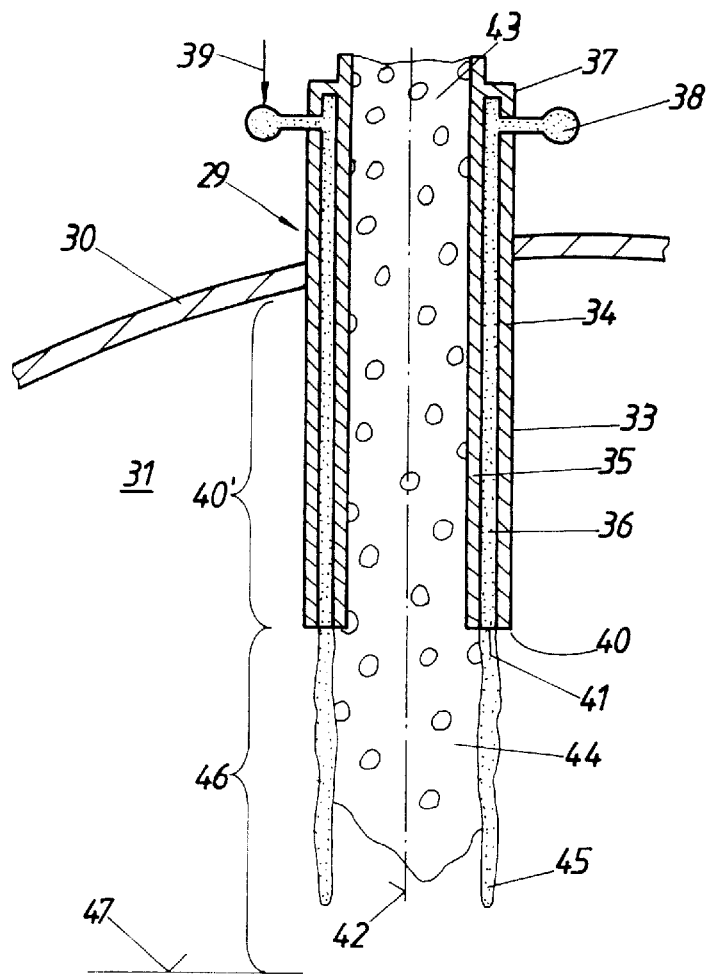
FIG. 2 is an expanded detail of a portion of FIG. 1.
Figure 3:
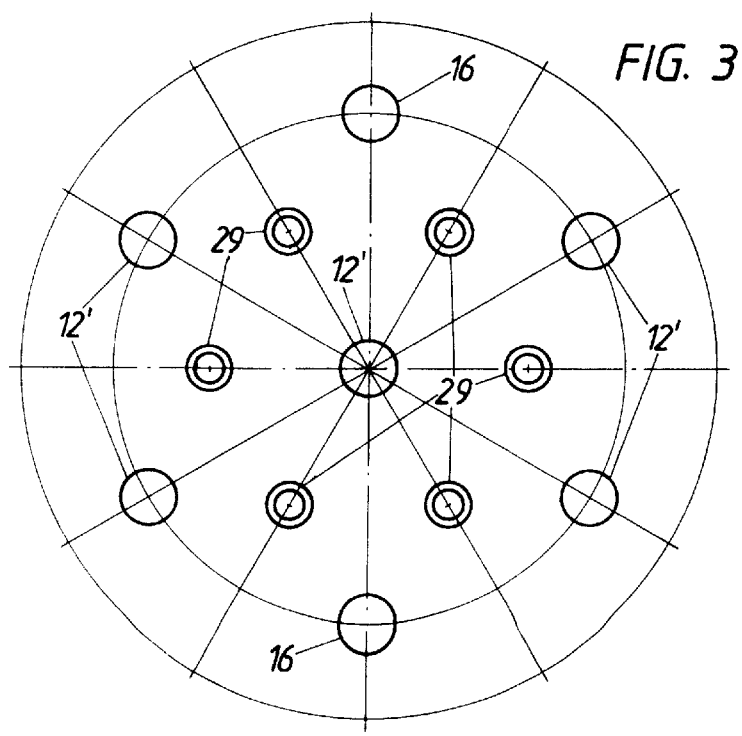
FIG. 3 is a top view of the melter gasifier schematically represented.

In accordance with the invention, the sponge iron is charged via at least one separate charging means 29 which is arranged at the dome 30 terminating the melter gasifier 10 toward the top and which is represented on a larger scale in FIG. 2. Preferably, several charging means 29 are provided disposed in an arrangement that is radially symmetrical about the longitudinal central axis 32 of the melter gasifier 10 (FIG. 3).

Each charging means 29 is provided with a double-jacketed pipe 33 projecting into the interior 31 of the melter gasifier 10. Between the outer jacket 34 and the inner jacket 35 of the double-jacketed pipe 33 a cavity 36 in the shape of an annular gap is formed which by its end 37 located outside of the melter gasifier 10 is connected to a circular feed duct 38 for a cooling gas. As the cooling gas there is utilized a cooled reducing gas branched off from the gas recirculating duct 25 via a branch duct 39 provided with preferably one further compressor not illustrated in detail. At the end 40 of the double-jacketed pipe 33 projecting into the interior 31 of the melter gasifier 10, there either is provided an annular gap opening 41 or there are arranged several adjacent bores the central axes of which are provided roughly parallel to the longitudinal central axis 42 of the double jacketed pipe 33, through which the cooling gas flows into the interior 31 of the melter gasifier 10.

The central interior space 43 of the double-jacketed pipe 33 is connected to the conveying duct 9 for charging the sponge iron. Through the double-jacketed pipe 33 forming a downpipe, the sponge iron drops into the interior 31 of the melter gasifier 10 and at the lower end 40 of the downpipe 33 forms a strand 44 falling on freely. The lower end 40 of the downpipe 33 is located at a vertical distance 40' from the dome 30 at a position where the reducing gas has not yet reached its maximum velocity of flow. By the cooling gas, which also streams out at the lower end 40 of the downpipe 33 and which here forms a gas jacket 45, this strand 44 is enclosed and prevented from expanding. Said gas jacket 45 thus forms a protective jacket over at least a portion 46 of the free fall of the sponge iron—like the downpipe 33—so that the fine particles of the sponge iron are not entrained by the reducing gas which streams upward at a relatively high velocity—whose velocity of flow is highest at the outlet connections 12'. At the height level 47, at which the strand 44 expands due to the decrease in the supporting effect of the gas jacket, the velocity of the reducing gas is considerably lower, so that the fine particles are not prevented from dropping or sinking down into the fluidized bed of the melt-down gasifying zone 11.

Thus, in accordance with the invention coarse and fine particles can be charged to the melter gasifier together; separation into a coarse- and a fine-grain fraction is not required.

The velocity of the cooling gas at the site of exiting from the downpipe, i.e. from the lower end 40 of the downpipe 33, is at least 10 times, preferably 50 to 100 times the maximum velocity of the reducing gas. This enables the walls of the gas jacket to be kept relatively thin, so that the amount of reducing gas recycled to the melter gasifier 10 is relatively small.

Causing a cooling gas to flow through the cavity 36 of the double-jacketed pipe 33 with subsequent emergence of the cooling gas at the lower opening 41 of the double-jacketed pipe 33 entails a cooling effect adjusted to the mechanical load on the double-jacketed pipe 33.

The cooling effect of the cooling gas is greatest where the mechanical load exerted on the double-jacketed pipe 33 by its own weight is greatest, namely in the region where the double-jacketed pipe 33 passes through the dome 30 of the melter gasifier 10. As the cooling gas flows onward through the cavity 36 of the double-jacketed pipe 33, heating of the cooling gas will ensue, resulting in an increase in the velocity of the cooling gas. For this reason it suffices to provide relatively short double-jacketed pipes 33, which are subject to a mechanical and thermal load that is correspondingly lower than that resulting with very long downpipes projecting to closely above the fluidized bed. As a result, the stability of the structure according to the invention is very high.

By the cooling effect, the use of very expensive special materials based on special ceramics or of superalloys based on Fe is rendered unnecessary. Rather, it suffices to make the double-jacketed pipe 33 from high-temperature steel.

What is claimed is:

1. A plant for charging metal carriers which contain at least a portion of fines, comprising a melter gasifier (10) which has feed ducts (17, 16, 9) for oxygen-containing gases and carbon carriers and at least partially reduced metal carriers and from which a gas discharge duct (12) for a reducing gas departs in the region of a dome (30) terminating the melter gasifier (10) toward the top, and which is provided with a tap (18) for a metal melt, adapted for pig iron and slag, wherein is provided a dome (30) terminating the melter gasifier (10) toward the top, at a radial distance from at least one gas discharge duct (12) for reducing gas, at least one feed duct (9) with a charging unit (29) for at least partially reduced metal carriers said feed duct being equipped with a downpipe (33) ending at a distance below the wall that forms the dome (30), wherein said downpipe

(33) is provided with a gas supply means (38) for the generation of a gas jacket (45) forming at the lower end (40) of the downpipe (33).

2. The plant according to claim 1, wherein the downpipe (33) comprises a double jacket (34, 35) defining an annular gap cavity (36) and the gas supply means (38) opens into said annular gap cavity (36).

3. The plant according to claim 2, wherein the lower end (40) of the downpipe (33) defines at least one annular gap opening (41) for the exit of a gas flowing through the annular gap cavity (36).

4. The plant according to claim 1, wherein the gas discharge duct (12) for the reducing gas comprises a cooling means (26), and from the cooling means (26) a branch duct (39) departs which is conducted to the gas supply means (38) of the downpipe (33) via a compressor.

5. The plant according to claim 4, wherein a plurality of downpipes (33) is arranged at the dome (30) of the melter gasifier (10), disposed in a radially symmetrical arrangement.

6. The plant for the production of metal melts, according to claim 1 comprising pig iron, from charging substances formed of iron ore, and of fluxes and at least partially containing a portion of fines, wherein at least two fluidized bed reactors (1 to 3) are provided connected in series, wherein the ore is conducted from fluidized bed reactor (1) to fluidized bed reactor (2, 3) via conveying ducts (6) in one direction and reducing gas is conducted from fluidized bed reactor (3) to fluidized bed reactor (2, 1) via reducing-gas connecting ducts (13) in the opposite direction, and a melter gasifier (10) is provided into which there runs a feed duct (9) for conducting the reduction product from the fluidized bed reactor (3) arranged last in.the direction of the ore flow and whose gas discharge duct (12) runs into the fluidized bed reactor (3) arranged last in the direction of the ore flow.

7. The plant according to claim 1, wherein the cooling means is a gas scrubber.

* * * * *